(12) United States Patent
Takeuchi

(10) Patent No.: US 7,545,433 B2
(45) Date of Patent: Jun. 9, 2009

(54) IMAGE PICKUP APPARATUS, IMAGE PICKUP METHOD, PROGRAM FOR IMPLEMENTING THE METHOD, AND STORAGE MEDIUM STORING THE PROGRAM

(75) Inventor: Kengo Takeuchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 785 days.

(21) Appl. No.: 11/145,045

(22) Filed: Jun. 3, 2005

(65) Prior Publication Data

US 2005/0270409 A1    Dec. 8, 2005

(30) Foreign Application Priority Data

Jun. 3, 2004    (JP)    ............... 2004-166329

(51) Int. Cl.
H04N 5/232    (2006.01)
(52) U.S. Cl. ...................... 348/349; 348/346
(58) Field of Classification Search ................. 348/346, 348/349, 353, 354, 355
See application file for complete search history.

(56) References Cited

U.S. PATENT DOCUMENTS

| | | | | |
|---|---|---|---|---|
| 6,122,446 A * | 9/2000 | Satoh | .......................... | 396/52 |
| 7,324,150 B2 * | 1/2008 | Shiraishi | .................... | 348/345 |
| 7,355,634 B2 * | 4/2008 | Yasuda | .................... | 348/220.1 |
| 2004/0056963 A1 * | 3/2004 | Ishikawa | ................. | 348/208.1 |
| 2005/0248681 A1 * | 11/2005 | Nozaki et al. | ............... | 348/345 |

FOREIGN PATENT DOCUMENTS

| JP | 6-98246 A | 4/1994 |
|---|---|---|
| JP | 11-327024 A | 11/1999 |
| JP | 2002-287195 A | 10/2002 |

* cited by examiner

Primary Examiner—David L Ometz
Assistant Examiner—Dillon Durnford-Geszvain
(74) Attorney, Agent, or Firm—Rossi, Kimms & McDowell, LLP

(57) ABSTRACT

An image pickup apparatus which is capable of accurately detecting a blur of a shot image. AF evaluation values are calculated before and after shooting for recording an image representing the subject image in a recording medium is performed. The correlation between the AF evaluation values calculated before the shooting and the signal indicative of the focus generated after the shooting is determined. It is determined whether the correlation is lower than a first threshold value and higher than a second threshold value.

7 Claims, 4 Drawing Sheets

IMAGE PICKUP APPARATUS, IMAGE PICKUP METHOD, PROGRAM FOR IMPLEMENTING THE METHOD, AND STORAGE MEDIUM STORING THE PROGRAM

BACKGROUND OF THE INVENTION

1. Field of the Invention

The present invention relates to an image pickup apparatus, an image pickup method, a program for implementing the method, and a storage medium storing the program. In particular, the present invention relates to an image pickup apparatus with an automatic focusing function, an image pickup method, a program for implementing the method, and a storage medium storing the program.

2. Description of the Related Art

In recent years, digital cameras as image pickup apparatuses have rapidly come into wide use; many of them have an automatic focusing function (hereinafter referred to as "the AF function") irrespective of shape, technical specifications, and so forth. When a shutter button is pressed halfway, the digital camera uses a scanning method to calculate AF evaluation values over the entire driving range of a focus lens based on high-frequency components extracted from an image pickup signal from an image pickup device such as a CCD, drives the focus lens to a position where the highest AF evaluation value is obtained and fixes the focus lens there. Then, when the shutter button is deeply pressed, the digital camera can perform shooting (i.e. an image pickup operation which is intended to record an image of a subject in a recording medium) with the AF evaluation value being high. As a result, a photographer who shoots using the digital camera can easily take a picture in focus without skillful camera work.

Although the above-mentioned digital cameras have the AF function, a recorded image can be out of focus (hereinafter merely referred to as "blur") due to motion of the entire camera caused by hand shake (hereinafter merely referred to as "shake"). Therefore, there has been proposed an image pickup apparatus which alerts a photographer to the shake when it is determined that a shot image is blurred due to failure in shooting (see Japanese Laid-Open Patent Publication (Kokai) No. H11-327024, for example).

Further, among the above-mentioned digital cameras, there is one which has a camera shake vibration absorbing function so as to suppress the effects of shake. This digital camera is provided with a detecting system which detects a shake, and a correcting system which makes a predetermined correction so as to compensate for the detected shake. There are the following two kinds of the detecting system: one which detects a shake using a velocity sensor such as a gyro sensor, and one which detects a shake through image processing according to a motion vector of an image. Also, there are the following two kinds of the correcting system: one which optically corrects light incident on a CCD, a film, or the like by moving a focus lens unit, and one which electrically corrects shot image data through image processing. A variety of correction modes have been devised using combinations of such detecting systems and correcting systems (see Japanese Laid-Open Patent Publication (Kokai) No. H06-98246).

The conventional digital cameras, however, use an external sensor, e.g. a velocity sensor such as a gyro sensor so as to detect a shake, and hence they cannot be small-sized.

Even if they can be small-sized, it is impossible to reliably detect a shake.

SUMMARY OF THE INVENTION

It is an object of the present invention to provide an image pickup apparatus and an image pickup method, which are capable of accurately detecting a blur of a shot image, a program for implementing the method, and a storage medium storing the program.

To attain the above object, in a first aspect of the present invention, there is provided an image pickup apparatus comprising an image pickup device, an optical system that forms a subject image on the image pickup device, a generating device that generates a signal indicative of a degree of focus of an optical system that forms a subject image on an image pickup device before and after shooting for recording an image representing the subject image in a recording medium is performed, a correlation determining device that determines a correlation between the signal indicative of the degree of focus generated before the shooting and the signal indicative of the degree of focus generated after the shooting, wherein the correlation determining device determines whether the correlation is lower than a first threshold value and higher than a second threshold value.

With the arrangement of the first aspect of the present invention, it is possible to surely detect a blur of a shot image.

Preferably, the image pickup apparatus further comprises a blur determining device that determines whether the image is blurred according to a result of determination carried out by the correlation determining device, wherein the blur determining device determines that the image is blurred when the correlation determining device determines that the correlation is lower than the first threshold value and higher than the second threshold value.

Preferably, the image pickup apparatus further comprises a display device that displays the image and a result of determination carried out by the blur determining device.

Preferably, the blur determining device determines that the image is not blurred when the correlation determining device determines that the correlation is lower than the second threshold value.

More preferably, the image has been shot in a state in which focusing in accordance with a signal indicative of the degree of focus is inhibited.

More preferably, the image pickup apparatus further comprises a recording device that records the image in the recording medium when the image has been shot in a state in which focusing in accordance with a signal indicative of the degree of focus is inhibited.

Preferably, the image pickup apparatus further comprises a switch that instructs preparations for shooting, and a timer that measures a period of time elapsed after the switch is pressed, and the blur determining device determines that the image has been shot in a state in which focusing in accordance with a signal indicative of the degree of focus is inhibited when the correlation determining device determines that the correlation is lower than the second threshold value and the period of time measured by the timer is longer than a predetermined period of time.

Preferably, the image pickup apparatus further comprises a detecting device that detects whether a control signal for inhibiting focusing in accordance with a signal indicative of the degree of focus has been output in shooting, and the blur determining device determines that the image is not blurred when the correlation determining device determines that the correlation is lower than the second threshold value and the control signal has been output.

To attain the above object, in a second aspect of the present invention, there is provided an image pickup method for an image pickup apparatus including an image pickup device, and an optical system that forms a subject image on the image pickup device, comprising a generating step of generating a signal indicative of a degree of focus of the optical system before and after shooting for recording an image representing the subject image in a recording medium is performed, and a correlation determining step of determining a correlation between the signal indicative of the degree of focus generated before the shooting and the signal indicative of the degree of focus generated after the shooting, wherein in the correlation determining step, it is determined whether that the correlation is lower than a first threshold value and higher than a second threshold value.

According to the second aspect of the present invention, the same effects as in the first aspect can be obtained.

To attain the above object, in a third aspect of the present invention, there is provided a program for causing an image pickup apparatus to execute an image pickup method, the image pickup apparatus includes an image pickup device, an optical system that forms a subject image on the image pickup device, comprising a generating module for generating a signal indicative of a degree of focus of the optical system before and after shooting for recording an image representing the subject image in a recording medium is performed, and a correlation determining module for determining a correlation between the signal indicative of the degree of focus generated before the shooting and the signal indicative of the degree of focus generated after the shooting, wherein the correlation determining module determines whether the correlation is lower than a first threshold value and higher than a second threshold value.

According to the third aspect of the present invention, the same effects as in the first aspect can be obtained.

To attain the above object, in a fourth aspect of the present invention, there is provided a computer-readable storage medium storing a program for executing an image pickup apparatus to execute an image pickup method, the image pickup apparatus includes an image pickup device, an optical system that forms a subject image on the image pickup device, comprising a generating module for generating a signal indicative of a degree of focus of the optical system before and after shooting for recording an image representing the subject image in a recording medium is performed, and a correlation determining module for determining a correlation between the signal indicative of the degree of focus generated before the shooting and the signal indicative of the degree of focus generated after the shooting, wherein the blur determining module determines whether the image is blurred when the correlation determining module determines that the correlation is lower than a first threshold value and higher than a second threshold value.

According to the fourth aspect of the present invention, the same effects as in the first aspect can be obtained.

The above and other objects, features, and advantages of the invention will become more apparent from the following detailed description taken in conjunction with the accompanying drawings.

DETAILED DESCRIPTION OF THE PREFERRED EMBODIMENTS

Figure 1:
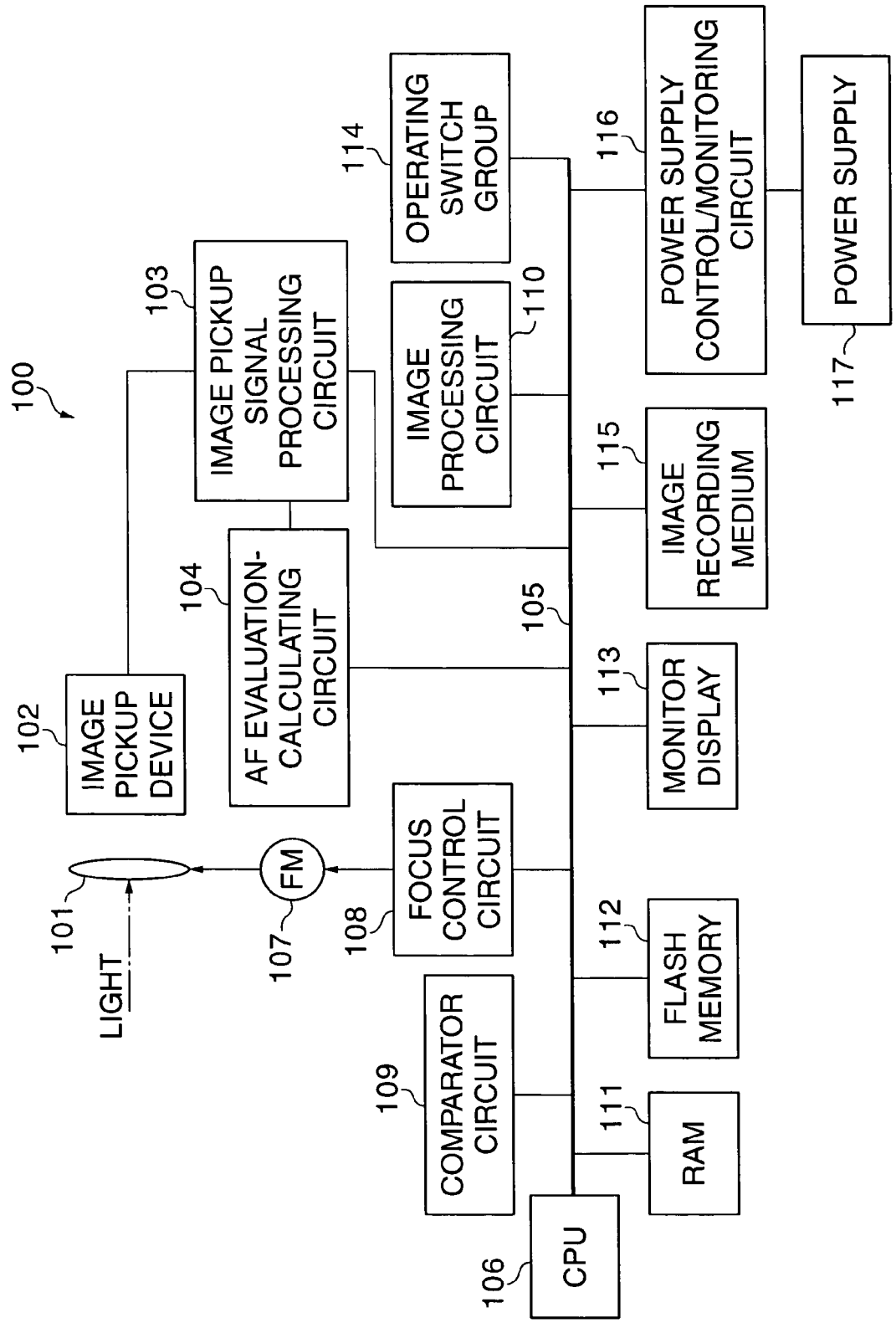
FIG. 1 is a block diagram schematically showing the construction of a digital camera according to an embodiment of the present invention.

The present invention will now be described in detail with reference to the drawings showing a preferred embodiment thereof. In the drawings, elements and parts which are identical throughout the views are designated by identical reference numerals, and duplicate description thereof is omitted.

FIG. 1 is a block diagram schematically showing the construction of a digital camera according to an embodiment of the present invention.

The digital camera 100 in FIG. 1 is comprised of a focus lens 101, a focus lens driving motor (hereinafter referred to as "the FM") 107 which drives the focus lens 101, an image pickup device 102 which receives light from a subject via the focus lens 101 and outputs an image pickup signal. The digital camera 100 is comprised of an image pickup signal processing circuit 103 connected to the image pickup device 102, an AF evaluation-calculating circuit 104 connected to the image pickup signal processing circuit 103, a focus control circuit 108 connected to the FM 107, a comparator circuit 109, an image processing circuit 110, a flash memory 112 which stores programs, a RAM 111 into which part of the programs stored in the flash memory 112 is loaded, a CPU 106 which controls component elements of the digital camera 100 and executes programs, a monitor display 113 which displays a picked-up image, an operating switch group 114 to which various operations are input, an image recording medium 115 which stores shot images, and a power supply control/monitoring circuit 116, all of which are connected to each other via a bus 105. The digital camera 100 also includes a power supply 117 connected to the power supply control/monitoring circuit 116.

The focus lens 101 focuses light from a subject to form an image on the image pickup device 102. The image pickup device 102 converts the focused light or formed image into an image pickup signal by photoelectric conversion and sends the image pickup signal to the image pickup signal processing circuit 103. The image pickup signal processing circuit 103 amplifies the received image pickup signal to the optimum level, performs signal processing, and sends the resulting image pickup signal to the monitor display 113, image processing circuit 110, and AF evaluation-calculating circuit 104.

The monitor display 113 displays an image based on the received image pickup signal, and the image processing circuit 110 converts the received image pickup signal into a JPEG image with an image size/compression ratio set in advance and sends the JPEG image to the image recording medium 115. The JPEG image is recorded as a shot image in the image recording medium 115.

On the other hand, the AF evaluation-calculating circuit 104 performs integration processing on the received image pickup signal so as to cope with noises and then performs processing such as band pass filtering to extract high-frequency components which can be regarded as the sharpness of an image. The AF evaluation-calculating circuit 104 then calculates an AF evaluation value based on the high-frequency components and outputs the same to the focus control circuit 108, RAM 111, and comparator circuit 109.

The focus control circuit 108 sends a control signal based on the output AF evaluation value to the focus lens driving motor 107, and the RAM 111 stores the AF evaluation value. The comparator circuit 109 compares the AF evaluation value output from the AF evaluation-calculating circuit 104 and the AF evaluation value stored in the RAM 111, or compares the AF evaluation values stored in the RAM 111 with each other.

Figure 2:
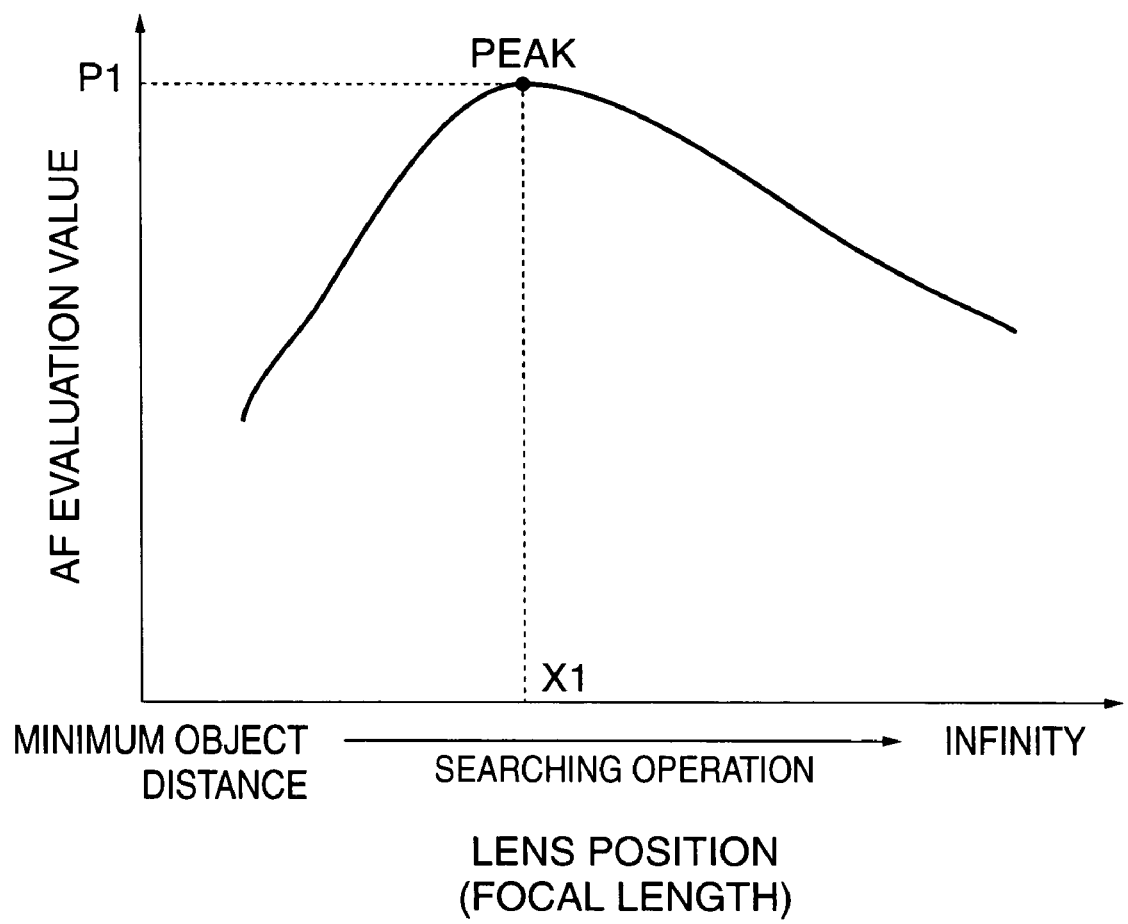
FIG. 2 is a graph showing the relationship between a position of a focus lens in FIG. 1 and an AF evaluation value calculated by an AF evaluation value-calculating circuit.

The AF function of the digital camera 100 employs a scanning method. The scanning method is such that when a shutter button is pressed halfway, an AF evaluation value is calculated while the focus lens 101 is being driven within such a range that the focal length is between minimum object distance and infinity, to obtain such a focus lens position X1 that the AF evaluation value becomes equal to the maximum value P1 (FIG. 2), and the focus lens 101 is driven to and fixed at the focus lens position X1. Then, when the shutter button is deeply pressed, shooting is performed with the AF evaluation value being high.

Figure 3:
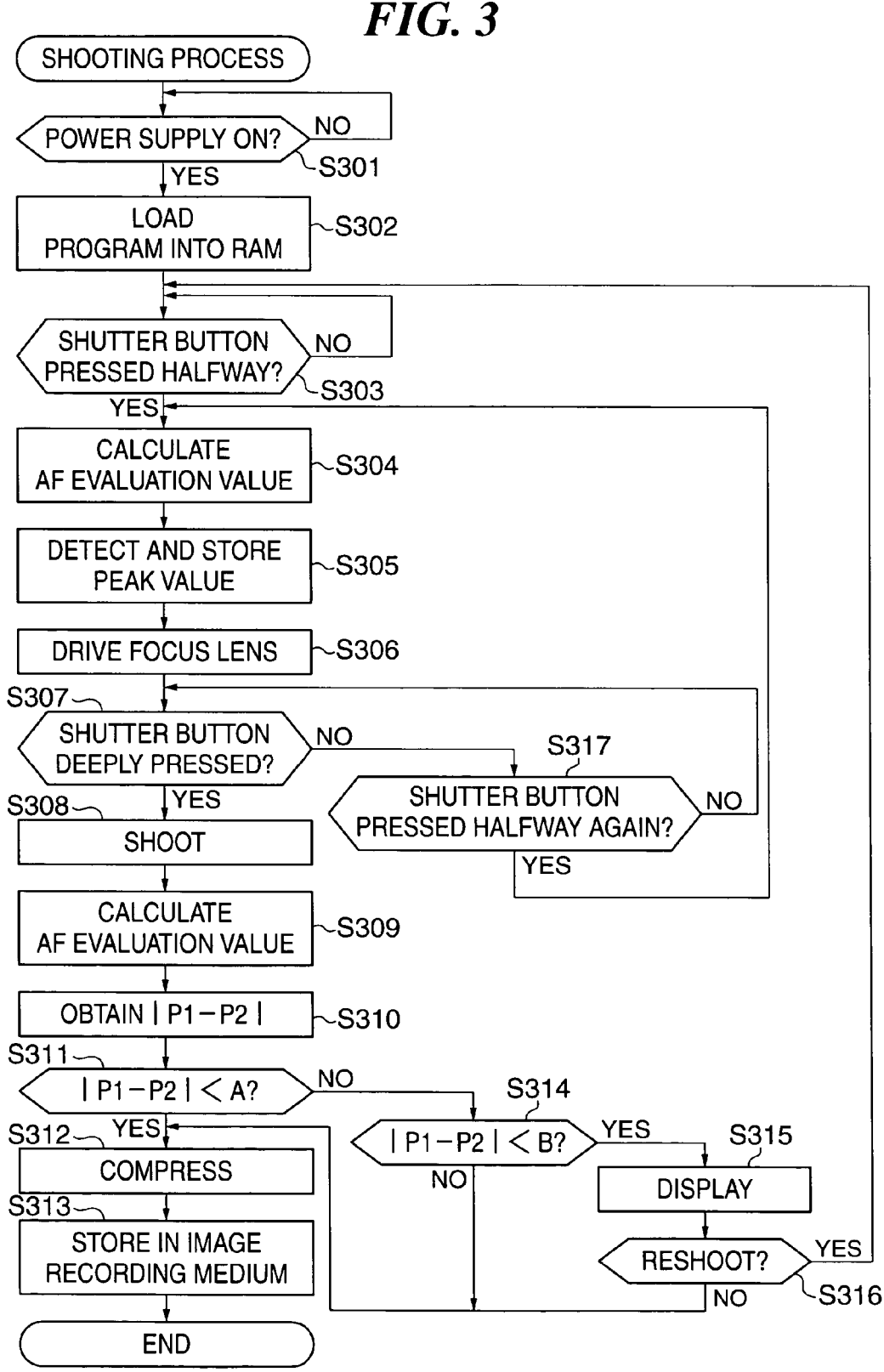
FIG. 3 is a flow chart showing a shooting process carried out by the digital camera in FIG. 1.

FIG. 3 is a flow chart showing a shooting process carried out by the digital camera 100 in FIG. 1.

This process is executed by the CPU 106 of the digital camera 100 in FIG. 1.

As shown in FIG. 3, when the power supply 107 of the digital camera 100 is turned on (YES to a step S301), a program is loaded into the RAM 111, and the digital camera 100 comes into a standby state (step S302).

Then, when the shutter button is pressed halfway (YES to a step S303), AF evaluation values over the entire driven range of the focus lens 101 are calculated (step S304), and a peak value P1 of the obtained AF evaluation values and a position X1 thereof are detected and the peak value P1 is stored in the RAM 111 (step S305). The focus lens 101 is driven to the position X1 (step S306). This completes preparations for shooting at the position with the highest AF evaluation value.

Figure 4A:
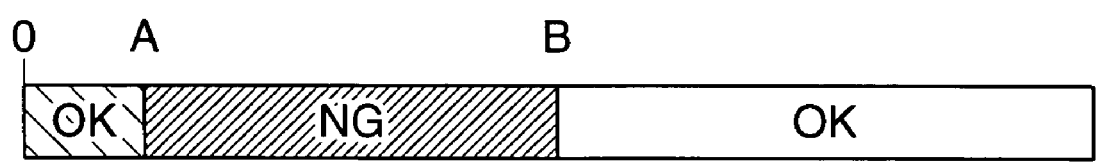
FIG. 4A is a diagram useful in explaining an indicator displayed on a monitor display.

Then, in a step S307, it is determined whether the shutter button has been deeply pressed or not. If the shutter button has been deeply pressed, shooting is performed by exposing the image pickup device 102 to light by taking a predetermined shutter action (step S308). Then, an AF evaluation value P2 is calculated again and an AF evaluation value P2 is stored in the RAM 111 (step S309), and the absolute value |P1−P2| of a difference between the AF evaluated value P1 and the AF evaluated value P2 stored in the RAM 111 is obtained (step S310) to determine whether or not the absolute value |P1−P2| is smaller than a predetermined threshold value A (step S311). As shown in FIG. 4A, referred to later, the threshold value A is for determining whether or not a degree to which a shot image is blurred is within the allowable range, and is empirically obtained by repeated experiments and may be changed within a predetermined range.

If it is determined in the step S311 that the absolute value |P1−P2| is smaller than the threshold value A, shot image data is JPEG-compressed according to a predetermined or user setting (step S312) and stored in the image recording medium 115 (step S313), followed by termination of the process.

If it is determined in the step S311 that the absolute value |P1−P2| is greater than the threshold value A, it is determined whether or not the absolute value |P1−P2| is smaller than a threshold value B (step S314). As shown in FIG. 4A, referred to later, the threshold value B is greater than the threshold value A, and is for determining whether or not an AF locking function of shooting by deeply pressing the shutter button after changing the angle of view with the focus lens 101 remaining fixed in position while the photographer is pressing the shutter button halfway has been positively used. Also, the threshold value B is empirically obtained by repeated experiments and can be changed within a predetermined range.

If it is determined in the step S314 that the absolute value |P1−P2| is smaller than the threshold value B, an indicator in FIG. 4B, referred to later, which shows the relationship between the threshold values A and B and the absolute value |P1−P2| is displayed on the monitor display 113 (step S315). Then, an alert to the necessity of reshooting is issued, and it is determined whether or not a reshooting instruction has been input (step S316). If the reshooting instruction has been input, the step S303 and the subsequent steps are repeated. If the reshooting instruction has not been input, the step S312 and the subsequent steps are executed to compress shot image data and record the same in the image recording medium 115, followed by termination of the process.

If it is determined in the step S314 that the absolute value |P1−P2| is greater than the threshold value B, it is judged that a significant difference between the AF evaluation values P1 and P2 in scanning and shooting has been caused by the photographer who has positively used the AF locking function, not by blurring. Then, the step S312 and the subsequent steps are executed without alerting to the necessity of reshooting, so that shot image data is compressed to be recorded in the image recording medium 115, followed by termination of the process.

If it is determined in the step S307 that the shutter button has not been deeply pressed, it is determined whether or not the shutter button has been pressed halfway again (step S317). If the shutter button has been pressed halfway again, the step S304 and the subsequent steps are executed again. On the other hand, if the shutter button has not been pressed halfway again, full depression of the shutter button is awaited (YES to the step S307), and the process proceeds to the step S308.

According to the process of FIG. 3, if the absolute value |P1−P2| is greater than the threshold value A (NO to the step S311) and smaller than the threshold value B (YES to the step S314), the indicator showing the relationship between the threshold values A and B and the absolute value |P1−P2| is displayed on the monitor display 113 (step S315). As a result, it is possible to detect a blur of a shot image without using an external sensor and to notify the photographer of a degree to which a shot image is blurred.

Figure 4B:
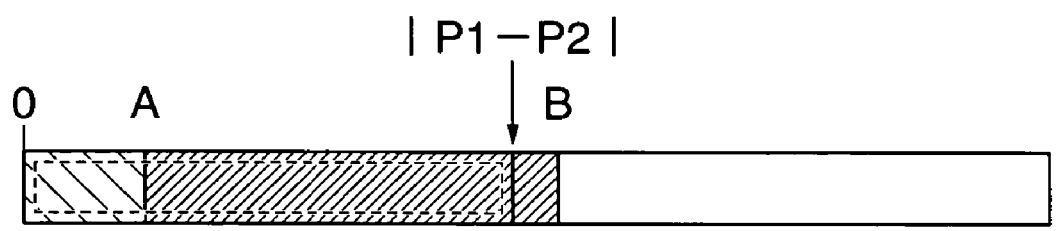
FIG. 4B is a diagram showing an example of the indicator displayed in steps S311 and S314 of FIG. 3.

FIG. 4A is a diagram useful in explaining the indicator displayed on the monitor display 113, and FIG. 4B is a diagram showing an example of the indicator displayed in the steps S311 and S314 in FIG. 3.

In FIG. 4A, a message "OK" is displayed within the range from 0 to A where the degree of blurring is assumed to be within the allowable range, a message "NG" is displayed within the range from A to B where the degree of blurring is assumed to be outside the allowable range, and a message "OK" is displayed in the range beyond B where it is assumed that the AF locking function has been used.

In FIG. 4B, the arrow indicates the calculated absolute value |P1−P2|. In the example shown in FIG. 4B, the absolute value |P1−P2| is within the range from A to B, it can be assumed that the degree of blurring is outside the allowable range, and the AF locking function has not been used.

In the example shown in FIG. 4B, since the relationship between the absolute value |P1−P2| and the threshold values A and B is displayed using the indicator, the photographer can know a possibility of failure in shooting and therefore easily determine whether to perform reshooting or not. This improves user-friendliness of the digital camera 100.

It should be noted that in the present embodiment, the sequence is such that after the shutter button is deeply pressed (shooting), the comparison result is displayed and reshooting is instructed, and reshot image data is stored in the recording medium as shown in FIG. 3. This is because neither a compressing step nor a storing step are not required when shooting has been unsuccessful. On the other hand, in the case where comparison of the AF evaluation values and compression control can be performed in parallel, the sequence may be such that shot image data is stored in the recording medium when the shutter button is deeply pressed (shooting), and thereafter, the comparison result is displayed and reshooting is instructed.

Further, although in the present embodiment, when it is determined in the step S311 that the absolute value |P1−P2| is greater than the threshold value B, it is determined that the photographer has performed shooting using the AF locking function positively, alternatively, whether or not the photographer has really used the AF locking function in a positive way may be checked according to whether an instruction has been given by a switching operation performed by the photographer (for example, an instruction has been given by operating an AF lock switch in the operating switch group 114 to which various operations are input), a period of time for which the shutter button has been pressed halfway and which is measured using a timer, or a control signal generated upon AF locking. For example, when it is determined in the step S311 that the value |P1−P2| is greater than the threshold value B, it is determined whether or not the period of time for which the shutter button has been pressed halfway is longer than a predetermined period of time, and if the determination result is positive, it is determined that the AF locking function has been positively used. Alternatively, when it is determined in the step S311 that the value |P1−P2| is greater than the threshold value B, whether or not the AF locking function has been positively used can be checked by referring to the AF lock control signal.

According to the alternative construction of the image pickup apparatus as described above, in the case where the absolute value |P1−P2| is greater than the threshold value B, it is possible to accurately determine whether the reason why the value |P1−P2| is greater than the threshold value B is that camera shake has occurred or shooting has been performed using the AF locking function. Therefore, in the case where shooting has been performed using the AF locking function, it is possible to prevent an alert to the necessity of reshooting from being issued by mistake to bother the photographer.

It should be noted that whether or not the photographer has performed shooting using the AF locking function in a positive way may be checked by complementarily using a gyro such as a vibration type gyro which detects a change in its own position by detecting a change in the motion of a piezoelectric substance vibrated in advance or an optical fiber gyro which detects a change in its own position by using interference of light inside an optical fiber, an angular velocity sensor, a acceleration sensor, or a vector detecting circuit which detects a motion vector indicative of a speed and a direction at and in which a subject image within the screen has moved according to a time series correlation between images. In the case where any of these sensors is used, a detected change is compared with a predetermined threshold value, and if the detected change is greater than the predetermined threshold value, it is determined that the photographer has used the AF locking function in a positive way.

In this way, by checking the result of comparison between the value |P1−P2| and the threshold value B, it is possible to perform shooting according to a photographer's intention.

It is to be understood that the object of the present invention may also be accomplished by supplying a system or an apparatus with a storage medium (or a recording medium) in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium in which the program code is stored constitute the present invention.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

Further, the above program has only to realize the functions of the above described embodiment on a computer, and the form of the program may be an object code, a program executed by an interpreter, or script data supplied to an OS.

Examples of the storage medium for supplying the program code include a RAM, a NV-RAM, a floppy (registered trademark) disk, an optical disk, a magneto-optical disk, a CD-ROM, a MO, a CD-R, a CD-RW, a DVD (a DVD-ROM, a DVD-RAM, a DVD-RW, or a DVD+RW), a magnetic tape, a nonvolatile memory card, and a ROM. Alternatively, the program may be supplied by downloading from another computer, a database, or the like, not shown, connected to the Internet, a commercial network, a local area network, or the like.

As many apparently widely different embodiments of the present invention can be made without departing from the spirit and scope thereof, it is to be understood that the invention is not limited to the above specific embodiment thereof.

CROSS REFERENCE TO RELATED APPLICATION

This application claims priority from Japanese Patent Application No. 2004-166329 filed Jun. 3, 2004, which is hereby incorporated by reference herein.

What is claimed is:

1. An image pickup apparatus comprising:
 a generating device that generates a signal indicative of a degree of focus of an optical system that forms a subject image on an image pickup device before and after shooting for recording an image representing a subject image in a recording medium;
 a correlation determining device that determines a correlation between the signal indicative of the degree of focus generated before the shooting and the signal indicative of the degree of focus generated after the shooting; and
 a blur determining device that determines whether the image is blurred according to a result of determination carried out by said correlation determining device, wherein said correlation determining device determines whether the correlation is lower than a first threshold value and higher than a second threshold value, and wherein said blur determining device determines that the image is blurred when said correlation determining device determines that the correlation is lower than the first threshold value and higher than the second threshold value.

2. An image pickup apparatus according to claim 1, further comprising a display device that displays the image and a result of determination carried out by said blur determining device.

3. An image pickup apparatus according to claim 1, wherein said blur determining device determines that the image is not blurred when said correlation determining device determines that the correlation is lower than the second threshold value.

4. An image pickup apparatus according to claim 3, wherein the image has been shot in a state in which focusing in accordance with a signal indicative of the degree of focus is inhibited.

5. An image pickup apparatus according to claim 4, further comprising a recording device that records the image in the recording medium when the image has been shot in a state in which focusing in accordance with a signal indicative of the degree of focus is inhibited.

6. An image pickup apparatus according to claim 1, further comprising:

a switch that instructs preparations for shooting; and a timer that measures a period of time elapsed after said switch is pressed, and wherein said blur determining device determines that the image has been shot in a state in which focusing in accordance with a signal indicative of the degree of focus is inhibited when said correlation determining device determines that the correlation is lower than the second threshold value and the period of time measured by said timer is longer than a predetermined period of time.

7. An image pickup apparatus according to claim 1, further comprising a detecting device that detects whether a control signal for inhibiting focusing in accordance with a signal indicative of the degree of focus has been output in shooting, and wherein said blur determining device determines that the image is not blurred when said correlation determining device determines that the correlation is lower than the second threshold value and the control signal has been output.

* * * * *